(12) United States Patent
Vishnubhatla et al.

(10) Patent No.: US 6,192,506 B1
(45) Date of Patent: Feb. 20, 2001

(54) CONTROLLER FOR SOLVING LOGIC

(75) Inventors: Suresh K. V. Vishnubhatla, Pittsburgh; Richard W. Kephart, Jr., Manor Township; Warren A. Edblad, Plum Boro.; Donal A. Spillane, Pittsburgh, all of PA (US)

(73) Assignee: Westinghouse Process Control, Inc., Pittsburgh, PA (US)

( * ) Notice: Under 35 U.S.C. 154(b), the term of this patent shall be extended for 0 days.

(21) Appl. No.: 09/052,510

(22) Filed: Mar. 31, 1998

(51) Int. Cl.[7] ...................................... G06F 19/00
(52) U.S. Cl. ...................... 716/4; 714/18; 700/18
(58) Field of Search ...................... 716/18; 700/18, 700/22; 714/18; 364/140

(56) References Cited

U.S. PATENT DOCUMENTS

| | | | |
|---|---|---|---|
| 4,162,536 | * 7/1979 | Morley | 714/18 |
| 5,265,004 | * 11/1993 | Schultz | 364/140 |
| 5,623,401 | * 4/1997 | Baxter | 700/18 |
| 5,731,712 | * 3/1998 | Welch | 326/41 |
| 5,777,869 | * 7/1998 | Welch | 700/18 |
| 5,963,446 | * 10/1999 | Klein et al. | 700/18 |
| 6,021,357 | * 2/2000 | Peterson | 700/18 |

* cited by examiner

Primary Examiner—Paul R. Lintz
Assistant Examiner—Thuan Do
(74) Attorney, Agent, or Firm—Marshall, O'Toole, Gerstein, Murray & Borun

(57) ABSTRACT

A logic controller includes a memory for storing representations of boolean logic. The boolean logic includes AND and OR boolean logic functions having target values and a plurality of inputs. The processor of the logic controller has input/output circuitry and communications circuitry which provide a plurality of input/output digital logic signals. The processor employs the digital logic signals and solves the boolean logic representations. A firmware routine solves each boolean logic function when the value of any of its inputs is equal to its target value.

24 Claims, 8 Drawing Sheets

FIG.6
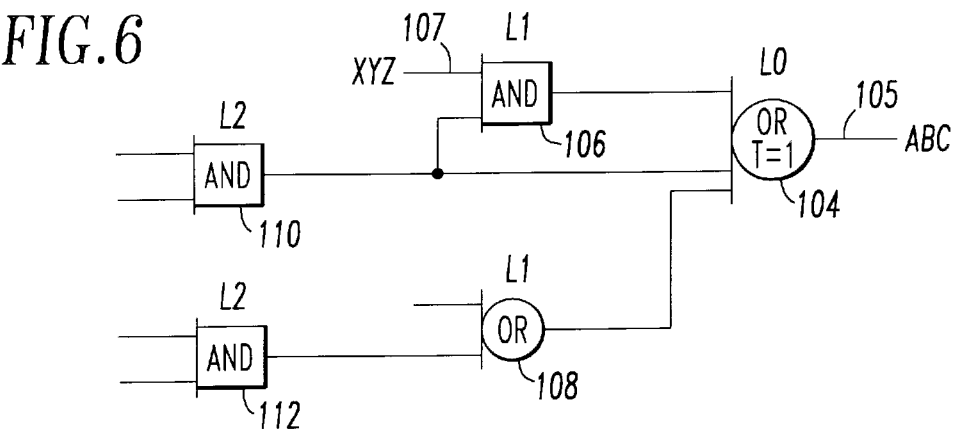
FIG.7
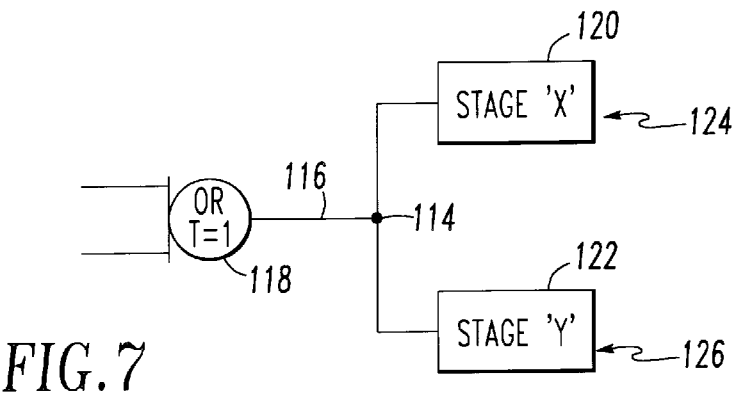
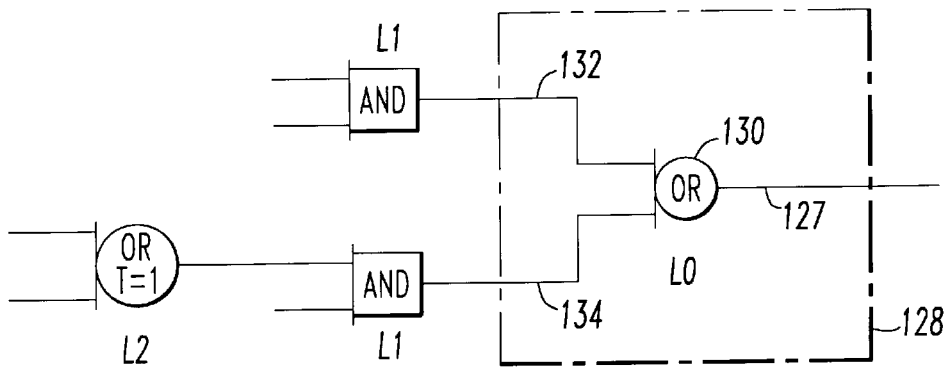
FIG.8

CONTROLLER FOR SOLVING LOGIC

BACKGROUND OF THE INVENTION

1. Field of the Invention

This invention relates to an apparatus for solving logic and, more particularly, to a controller for solving boolean logic.

2. Background Information

Programmable logic controllers (PLCs) are well-known in the art. PLCs are utilized in a wide variety of industrial plants to solve ladder logic, such as a ladder diagram, which is represented by a power rail, plural input contacts, one or more output coils and a neutral rail. Typically, PLCs employ a combination of hardware and/or software circuits to rapidly solve the ladder logic.

Although ladder logic is readily understood by plant personnel responsible for the operation of an industrial plant, often, the control strategy, as designed by control engineers, is defined using standard graphic symbols. For example, when the control strategy includes boolean logic, circuit elements such as AND, OR and NOT logic gates are employed. Accordingly, whenever that control strategy is implemented in PLCs or other controllers for the plant control system, it is necessary to convert the control strategy from boolean logic to ladder logic.

It is known to solve either ladder logic or boolean logic in software. For example, a processor employs "hot code" which is pre-compiled to solve a particular set of ladder logic or boolean logic, respectively. Whenever changes to the ladder logic or boolean logic are required, it is necessary to recompile the "hot code" for the different logic configuration. Another disadvantage of "hot code" is that each of the respective ladder logic elements or boolean logic elements must be fully evaluated to determine the final logic outputs.

It is also known to monitor all inputs to the ladder logic or boolean logic for any change of state. Whenever a change of one or more inputs is detected, the corresponding logic is evaluated to determine the new results. Under normal conditions, during which only a relatively few inputs change over a relatively long period of time, there is no problem. However, under plant upset conditions (e.g., the trip of a power plant), many inputs may change in relatively short succession, thereby possibly overloading the control system.

Accordingly, there is room for improvement.

SUMMARY OF THE INVENTION

The present invention provides a controller which solves logic. The logic includes a logic function having a target value and a plurality of inputs. As an important aspect of the invention, the controller includes means for solving the logic function when the value of any of its inputs is equal to its target value. In this manner, typically, only a portion of the overall logic function needs to be solved, thereby improving the performance of the controller.

The controller comprises means for storing representations of logic which includes a logic function having a target value and a plurality of inputs each of which has a value; means for providing a plurality of digital logic signals; means for solving the representations of the logic employing at least some of the digital logic signals; and means for solving the logic function when the value of any of the inputs is equal to the target value.

As a preferred refinement, the logic includes a plurality of logic circuit elements. The means for solving the logic function, which has an execution cycle during which the logic function is solved, includes means for solving the boolean value of one of the logic circuit elements and for solving the boolean value of the other logic circuit elements. This latter means solves the boolean value of the one logic circuit element once during the execution cycle. As the output of the one logic circuit element may be input by other logic circuit elements, this further improves the performance of the controller.

As another preferred refinement, the means for storing representations of logic includes first memory means for storing first boolean values, and the means for providing a plurality of digital logic signals includes second memory means for storing second boolean values. The inputs of the logic circuit elements include at least one first input which is connected to the output of one of the logic circuit elements, and at least one second input having one of the second boolean values. The means for solving the logic function includes output solving means for solving the output of the latter logic circuit element and storing the same as one of the first boolean values.

As a further refinement, the means for solving the logic function further includes logic solving means for solving the logic when either: (a) either the latter first boolean value or the latter second boolean value is equal to the target value, or (b) all of the logic circuit elements of the logic have been solved. Since, typically, only a portion of the logic circuit elements needs to be solved, this enhances performance.

As another refinement, the means for providing a plurality of digital logic signals includes memory means for storing boolean values. The at least one input of the logic circuit elements is a plurality of first inputs each of which is interconnected with the output of one of the logic circuit elements, and a plurality of second inputs each of which has one of the boolean values stored by the memory means. The means for solving the logic function has an execution cycle during which the logic function is solved and includes means for determining in a current execution cycle whether the target value of one of the second inputs is equal to the latter boolean value stored by the memory means by evaluating one of the second inputs, and means for evaluating in a subsequent execution cycle the second inputs to determine whether the latter target value is equal to the latter boolean value before evaluating the first inputs. In this manner, additional optimization is applied during execution by dynamically scheduling the order of evaluation of the first inputs and the second inputs.

BRIEF DESCRIPTION OF THE DRAWINGS

FIG. 6 is a diagram of boolean logic AND and OR circuit elements;

FIG. 7 is a diagram of boolean logic including a branch node which is assigned to two different logic stages;

FIG. 8 is a diagram of boolean logic in which a logic stage employs two evaluation paths;

DESCRIPTION OF THE PREFERRED EMBODIMENT

Figure 1:
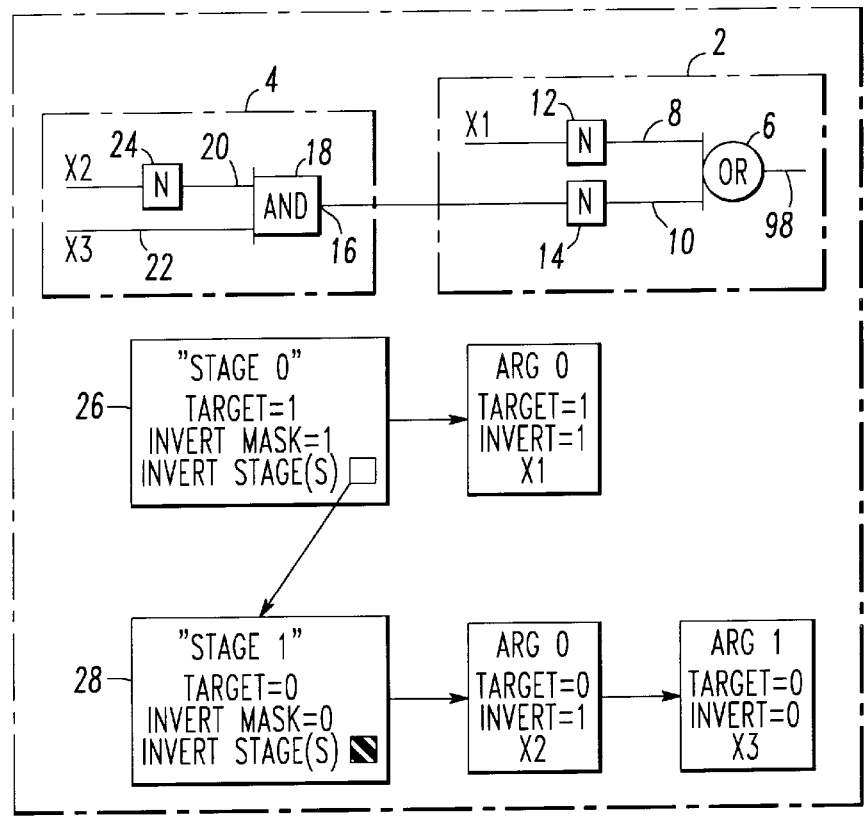
FIG. 1 is a diagram of boolean logic including two logic stages employing inversions and target values in accordance with the invention.

Referring to FIG. 1, two stages 2,4 of boolean logic are illustrated. One stage 2 ("Stage 0") includes an OR gate 6 having two inputs 8,10 and two inverters or NOT gates 12,14 for the respective inputs. A boolean signal X1 is connected to the NOT gate 12 and the output 16 of the other stage 4 ("Stage 1") is connected to the NOT gate 14. The stage 4 includes an AND gate 18 having two inputs 20,22 and one inverter or NOT gate 24 for the input 20. A boolean signal X2 is connected to the NOT gate 24 and another boolean signal X3 is connected to the input 22.

Also shown in FIG. 1 are representations 26,28 of the respective stages 2,4. Also referring to FIG. 2, the representations 26,28 each include a stage data structure 30. The exemplary stage data structure 30 includes data fields 32,34, 36,38, 40,42,44. The stageId field 32 is an integer value (e.g., 0 for "Stage 0", 1 for "Stage 1") which identifies the stages 2,4. The targetResult field 34 associated with the stage is the dominant boolean value that allows the evaluation of the stage to end. The target value (i.e., boolean value 0 or boolean value 1) is determined by the type of boolean logic gates (e.g., AND, OR, respectively) that make up the stage. For example, if input 10 of OR gate 6 has a boolean value equal to the target value (i.e., a boolean 1) for stage 2, then stage 2 is solved and the other inputs, such as input 8, need not be considered.

The numInStages field 36 is an integer count of the number of input stages which input to the present stage (e.g., 1 for exemplary "Stage 0", 0 for exemplary "Stage 1"). Similarly, the numArgs field 38 is an integer count (e.g., 1 for exemplary "Stage 0", 2 for exemplary "Stage 1") of discrete named inputs (e.g., X1, X2, X3) which are input to the present stage.

The invertMask field 40 is an exemplary N-bit (e.g., N=32) field. The bit position of the field 40 corresponds to the index to an inStages field 42 which is an array of all of the stage indices that are input to the present stage. For example, in the invertMask field for stage 2, bit 0 corresponds to the first input stage (i.e., stage 4) and the other bits are undefined since there is only one input stage. In this example, bit 0 (i.e., set to 1) indicates that the output 16 of stage 4 is inverted by inverter 14 before it is used at input 10 to evaluate the OR gate 6 of stage 2. As another example, the inStages array for stage 2 includes the index to stage 4, and the inStages array for stage 4 is empty as only named inputs X2,X3 feed that stage.

The arg field 44 is a pointer to an array 48 of argument data structures (e.g., DATA_STRUCTa, DATA_STRUCTb, DATA_STRUCTc) that hold the system identifiers (SIDs) of the named inputs to be read by the present stage. For example, the arg field for stage 2 points to an argument data structures array that holds one SID for the named input X1. The argument data structure 50 of FIG. 3 includes SID 52 which is employed to access the boolean value of the corresponding named input from memory 79 of FIG. 5. As further examples, the array 48 for stage 2 has one data structure that holds the SID for the named input X1, while the array 48 for stage 4 has two data structures which respectively hold the SIDs for the named inputs X2 and X3.

The stage data structure 30 is summarized as follows:

stageId: an integer value (e.g., 0, 1, 2) assigned to each stage: the stageIds, starting with 0, in the exemplary embodiment are unique for each logic circuit drawing sheet;

targetResult: the dominant boolean value (i.e., 0 or 1) which solves the stage such that if any input to the current stage has the value targetResult, then the current stage is solved;

numInStages: a count of stages that are input to this stage;

numArgs: a count of discrete named inputs that are input to this stage;

invertMask: an exemplary N-bit (e.g., N=32) field in which the bit position corresponds to the index of the inStages array (i.e., bit 0 corresponds to the first input stage): when a bit is equal to 1, the evaluation result of the corresponding stage is inverted before it is used to evaluate the current stage;

inStages: an array of stage indices that are input to this stage; and arg: a pointer to an array of argument structures that hold the system identifiers (SIDs) of the named inputs to this stage.

Each of the stageId fields 32 are employed to index a cache 45 including a StageSolved field 46 and a StageValue field 47 for each of the stages as follows:

StageSolved: a boolean value (i.e., 0 or 1) which, if set to one, indicates that this stage has been solved for the present execution cycle; and StageValue: the boolean value that is output by this stage.

Figure 4:
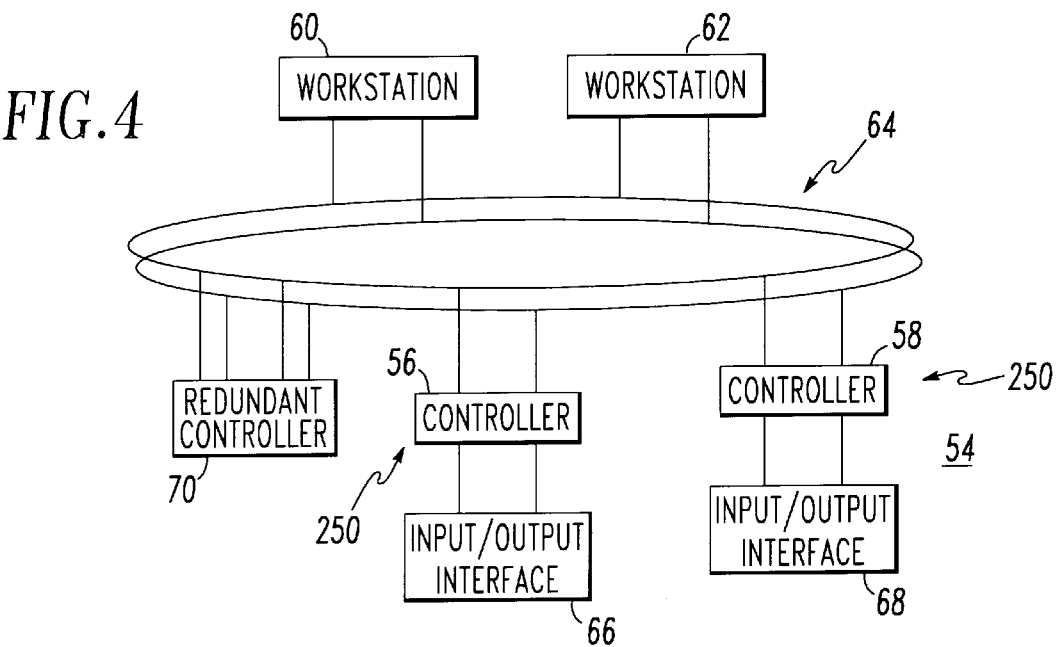
FIG. 4 is a block diagram of an information system, such as a data acquisition and control system, employing controllers in accordance with the invention.

Referring to FIG. 4, a information system, such as the exemplary data acquisition and control system 54, is illustrated. The system 54 includes controllers 56,58 and engineering workstations 60,62 interconnected by a communication network, such as the exemplary FDDI network 64. The workstations 60,62 are employed to program and/or monitor the controllers 56,58 over the network 64. The controllers 56,58 have respective input/output interfaces 66,68.

Figure 5:
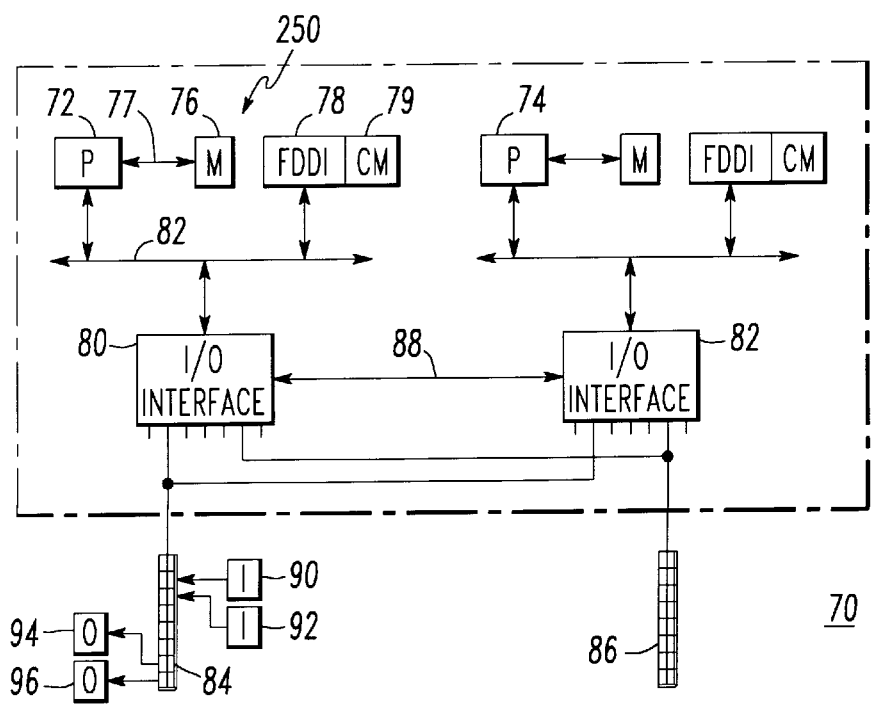
FIG. 5 is a block diagram of a redundant version of the controller of FIG. 4.

Although the controllers 56,58 may be implemented with a single processor, preferably a redundant controller 70 is provided with redundant processors (P) 72,74 as shown in FIG. 5. The processors 72,74, as shown with the processor 72, each have a memory (M) 76 connected to the processor by a first bus 77, and an FDDI interface 78 and an I/O interface 80 connected to the processor by a second bus 82. The I/O interfaces 80,82 of the respective processors 72,74 are connected to I/O branches 84,86. Access to and control of the I/O branches 84,86 through the appropriate one of the I/O interfaces 80,82 is determined by communications between the processors 72,74 through a data link 88 between the interfaces 80,82. In turn, as shown with I/O branch 84, the branches 84,86 have plural inputs (I) 90,92 and plural outputs (O) 94,96.

The inputs 90,92 include a wide variety of plant process inputs such as, for example, digital inputs and contact inputs, and the outputs 94,96 include a wide variety of plant process outputs such as, for example, digital outputs and contact outputs. In the exemplary embodiment, the boolean values of the inputs 90,92 and outputs 94,96 are preferably stored in memory (CM) 79 of the FDDI interface 78. These and other inputs and outputs are communicated by the FDDI interface 78 between the controllers 56,58,70 over the FDDI communication network 64 of FIG. 4. Again, the boolean values of the communication inputs and outputs are stored in the memory 79 of the interface 78. The processor 72 includes an input scan routine which inputs digital logic signals from the I/O interface 80 (and inputs 90,92) and stores those signals as boolean values in the memory 79, and an output scan routine which retrieves boolean values from the memory 79 and outputs those signals to the I/O interface 80 (and outputs 94,96).

Referring again to FIG. 1, a boolean circuit, such as the exemplary circuit formed by the stages 2,4, typically has inputs, such as X1,X2,X3, to boolean logic which determines a result, such as output 98. The exemplary controllers 56,58,70 of FIG. 4 include a boolean sub-system having a boolean logic solving routine 250 which executes boolean logic for the data acquisition and control system 54. This boolean sub-system represents the boolean circuit as a series of connected gates having one or more outputs for the one or more results of the boolean logic.

Figure 3:
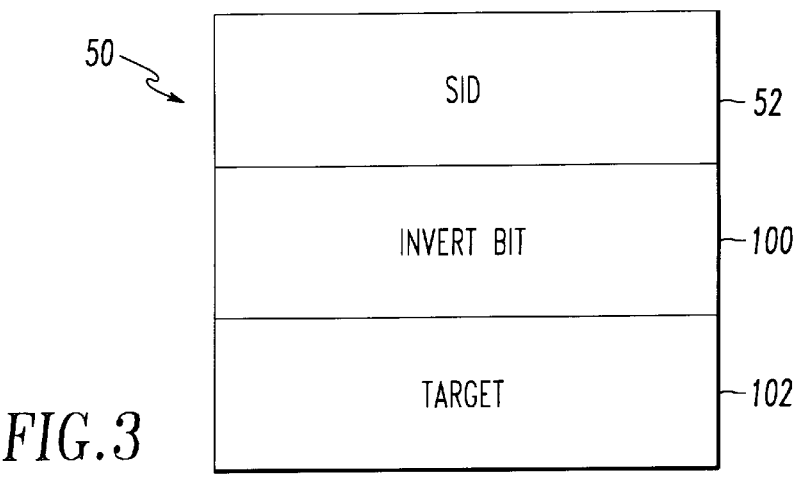

For each of the named inputs to the stages 2,4, as shown in FIG. 3, the argument data structure 50 includes an invertBit field 100 and a Target field 102. For example, for the named inputs X1 and X2 of FIG. 1, the invertBit field is a logic one to represent the respective NOT gates 12,24, and for the named input X3, the invertBit field is a logic zero as no inverter is employed.

Levels are physical references, such as numbers (e.g., 0, 1, 2), in a logic circuit. Levels represent the depth into the logic circuit of a particular element with respect to the output of the final gate. The control builder sub-system (not shown) of the workstations 60,62 of FIG. 4, assigns levels by traversing the logic circuit from output to input and sequentially assigning level numbers to each circuit element which is encountered.

The control builder, when considering a gate at the next successive level, treats NOT gates as follows. As shown in FIG. 1, if a NOT gate is encountered when traversing the execution path for a particular input, then a logical NOT operation is applied to the invert bit which corresponds to that particular input. More specifically, if an input is named, such as X1 or X2, then the invertBit field 100 is set to a logic one. On the other hand, if the input is not named and, thus, is provided by another stage, then the corresponding bit of the invertMask field 40 for the current stage is set to a logic one if a NOT gate was encountered.

For the named input X1 of stage 2, for example, the Target field 102 is assigned a logic one for the OR gate 6, and for the named inputs X2 and X3 of stage 4, the Target field 102 is assigned a logic zero for the AND gate 18. Once the value of a particular named input is found to match its associated target value, no additional named inputs need to be considered for the current stage. In addition to associating target values to the Target field of each of the named inputs, the control builder also assigns a target value to the targetResult field 34 of each of the exemplary stages 2,4. Similarly, once the value of a particular input stage is found to match the current stage's target value, no additional input stages need to be considered.

Since any particular circuit element or stage may be employed in the evaluation expression for one or more named outputs, such stage appears in each list of stages to be solved. The workstations 60,62 of FIG. 4 employ a boolean reduction algorithm which builds each stage only one time in order that, as a preferred aspect of the invention, the boolean logic solving routine 250 solves and caches the result for each stage only one time for each execution cycle of the controllers 56,58,70, thereby saving run-time duty cycle of these controllers. The boolean reduction algorithm, for a sheet of a logic circuit drawing, builds stages to minimize memory accesses for named inputs and to maximize the count of stage results that are shared between the named outputs. In this manner, such shared stages are evaluated only once for each execution cycle.

The control builder of the workstations 60,62 of FIG. 4 allows a user to describe one or more boolean circuits as series of connected boolean logic gates for execution by the boolean sub-system of the controllers 56,58,70, without the need to convert the boolean circuit to another form. In turn, the execution of the boolean circuits may be monitored in real time at the workstations 60,62.

The user builds the boolean circuits with the control builder which, in turn, parses the logic circuit drawing sheet and builds a set of data structures according to the boolean reduction algorithm, as described below. The boolean reduction algorithm provides an abstract representation of the logic circuit to the controllers 56,58,70 in order to minimize both: (1) the count of memory accesses by the controller; and (2) the controller duty cycle needed to determine the outputs of the logic circuit. The boolean reduction algorithm is applied to all of the exemplary combinatorial logic functions, as well as the sequential logic functions, discussed below in connection with FIGS. 11–13, which are implemented with circuit models made of combinatorial logic functions. In turn, the control builder loads the abstract representation into the controller which executes the boolean logic solving routine 250 to determine the value of the outputs.

In the exemplary embodiment, the outputs of the combinatorial logic functions and the sequential logic functions may have names which are useful in both programming the data acquisition and control system 54 and in communicating such outputs between the controllers 56,58,70. Also, in the exemplary embodiment, the initial inputs, the final output, and the output of FLIP-FLOPs are named, although, in general, other outputs, such as internal stage outputs, are not named. Furthermore, the exemplary control builder ensures, for the boolean sub-system, that the outputs of the non-boolean functions are named and, as a result, if the output of a non-boolean function is also an input to a boolean function, then the input of that boolean function is treated as if it were named.

The boolean reduction algorithm preferably partitions data structures in order that blocks of logic circuit elements which are shared between different outputs are evaluated only once per each controller execution cycle. The boolean logic solving routine 250 realizes this optimization at run-time by caching all intermediate results during each execution cycle. Thus, if during the same execution cycle it is desired to evaluate any of such logic circuit elements again, then the previously cached intermediate result is accessed, thereby saving duty cycle of the controller.

The boolean reduction algorithm separately considers the named outputs. A logical representation of these named outputs is obtained by considering the logic circuit from output to input. The resulting logical expression consists of named inputs and logical groupings of boolean circuit elements (e.g., AND, OR) whose outputs are neither named inputs nor named outputs. Such groupings are termed stages herein. The boolean logic solving routine 250 evaluates a stage to produce a result that: (1) directly determines the logic circuit output; or (2) is combined with the results of other stages to determine the logic circuit output.

Stages may be formed from several logic circuit elements of the original logic circuit drawing sheet. A stage may input: (1) named input(s); (2) named output(s); and/or (3) the outputs(s) of other stage(s). In turn, the stages of a logic circuit are ordered hierarchically from output to input. As a result, for each named output, there are a series of stages arranged hierarchically in order that all of the circuit elements, which may be employed to solve the named output, are contained in the list of stages.

As shown in FIG. 6, the exemplary three-input OR gate 104 (having targetResult=T=1) is assigned level zero (L0). The logic circuit elements 106,108 which directly input to level zero are assigned level one (L1) and circuit elements 110,112 which directly input to the level one circuit elements are assigned level two (L2). The control builder continues to assign levels by this sequence until all circuit elements are assigned level numbers.

The named output 105 (ABC) of the OR gate 104 has a boolean value which is determined by one or more of this gate's three inputs. In this example, the three inputs of gate 104 have boolean values which are respectively determined by the gates 106,110,108. Also, the two inputs of gate 106 have boolean values which are respectively determined by the named input 107 (XYZ) and the output of gate 110. In the exemplary embodiment, the boolean values of the named input 107 and named output 105 are preferably stored in the communication interface memory 79 of FIG. 5. On the other hand, the unnamed outputs of the gates 106,108,110,112 are preferably stored in the memory 76 of the processor 72.

As shown in FIG. 7, a branch node 114 is a node (e.g., output 116 of OR gate 118 which feeds two or more circuit elements 120,122) in a logic circuit which is assigned to at least two different stages 124,126.

Referring to FIG. 8, evaluation paths are defined by the control builder in the context of either circuit elements or stages. An evaluation path is an ordered list of circuit elements or stages. In turn, this list is employed to solve each input of a circuit element or stage. Circuit elements of an evaluation path are ordered based on their respective circuit level. To completely determine the output of a circuit element or stage, the count of the evaluation paths is equal to the number of inputs. Hence, a four-input AND gate may require up to four separate evaluation paths to determine its output. For example, the output 127 of the stage 128 having two-input OR gate 130 employs two evaluation paths 132, 134.

Figure 9:
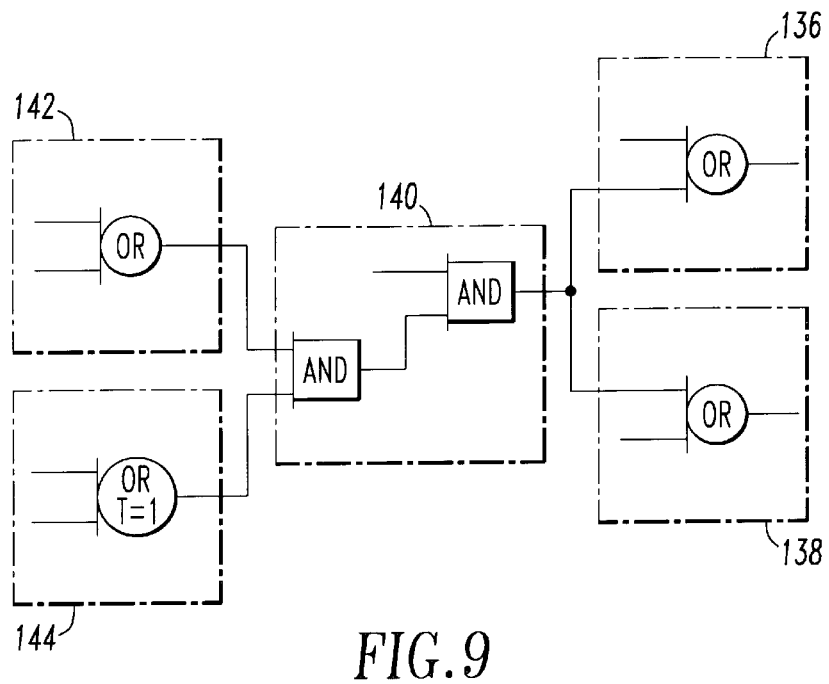
FIG. 9 is a diagram of boolean logic including a plurality of logic stages.

The control builder parses the logic circuit drawing sheet and builds the stages based on rules. Each logic circuit is considered per named output. For each named output, an ordered list of stages is created by considering the logic circuit from output to input according to the following rules: (1) a new stage is started at the gate that outputs the named output that is being evaluated; (2) a new stage starts at a branch node; and (3) if, for a particular gate, the gate at the next successive level is not a named output and is of a different logic type, then a new stage is started at the next level. For example, an exemplary application of these rules is shown in FIG. 9 in which: (a) stages 136,138 are built according to Rule 1; (b) stage 140 is built according to Rule 2; and (3) stages 142,144 are built according to Rule 3.

Figure 10A:
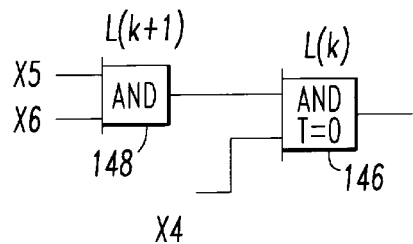
FIGS. 10A and 10B are diagrams of boolean logic employing two AND circuit elements and one equivalent AND circuit element, respectively.
Figure 10B:
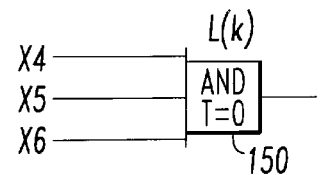

Referring to FIGS. 10A and 10B, as the two-input AND gate 146 at level k (e.g., level 0) and the two-input AND gate 148 at level k+1, which outputs to the gate 146 at level k, are the same boolean logic type (i.e., in this example, both are AND gates), then all inputs X4,X5,X6 from both gates are defined by the control builder to be inputs to the three-input AND gate 150 at level k. This rule may be extended to level k+n−1 if the same boolean logic type is found at n successive levels.

Figure 11:
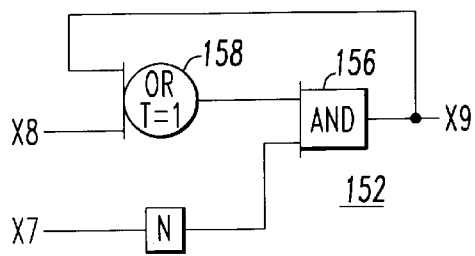
FIGS. 11 and 12 are diagrams of boolean logic for a reset-override FLIP-FLOP and a set-override FLIP-FLOP, respectively.
Figure 12:
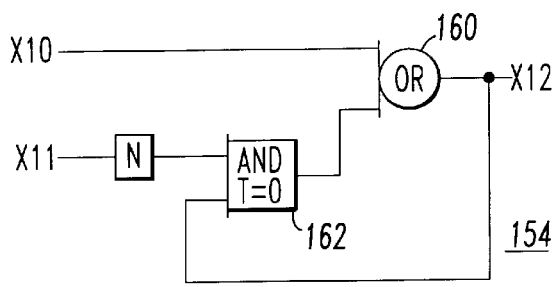

The boolean logic circuit may include boolean combinatorial logic functions, such as AND, OR, "exclusive or" (XOR) and NOT, as well as non-boolean sequential logic functions, such as set-override FLIP-FLOP, reset-override FLIP-FLOP, TIMER and ONE-SHOT. The control builder implements FLIP-FLOPs by utilizing models comprised of boolean combinatorial logic elements. FIG. 11 shows the circuit model for the reset-override FLIP-FLOP 152, and FIG. 12 shows the set-override FLIP-FLOP circuit model 154, in which the respective stages 156 and 158, and 160 and 162, are built by the control builder according to the above-described rules. The reset-override FLIP-FLOP 152 includes named reset input X7, named set input X8 and named output X9. The set-override FLIP-FLOP 154 includes named set input X10, named reset input X11 and named output X12.

Figure 13:
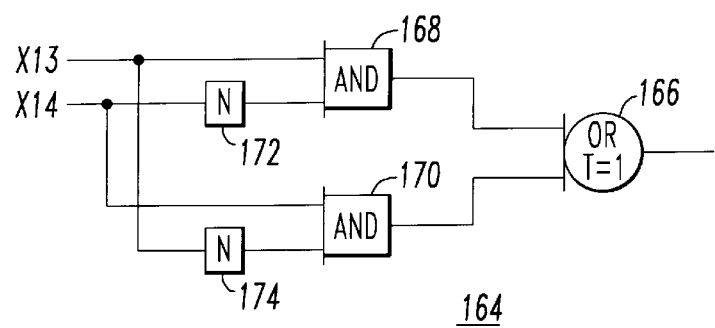
FIG. 13 is a diagram of boolean logic for a two-input XOR circuit element.

Referring to FIG. 13, a two-input XOR gate 164 is illustrated. If more inputs are desired, then the XOR gates may be cascaded together. The XOR function follows the same model idea as the FLIP-FLOPs of FIGS. 11 and 12. The XOR gate 164 includes OR gate 166, AND gates 168,170, inverters 172,174 and named inputs X13,X14. The three stages 166,168,170 are built by the control builder according to the rules defined previously.

Figure 14:
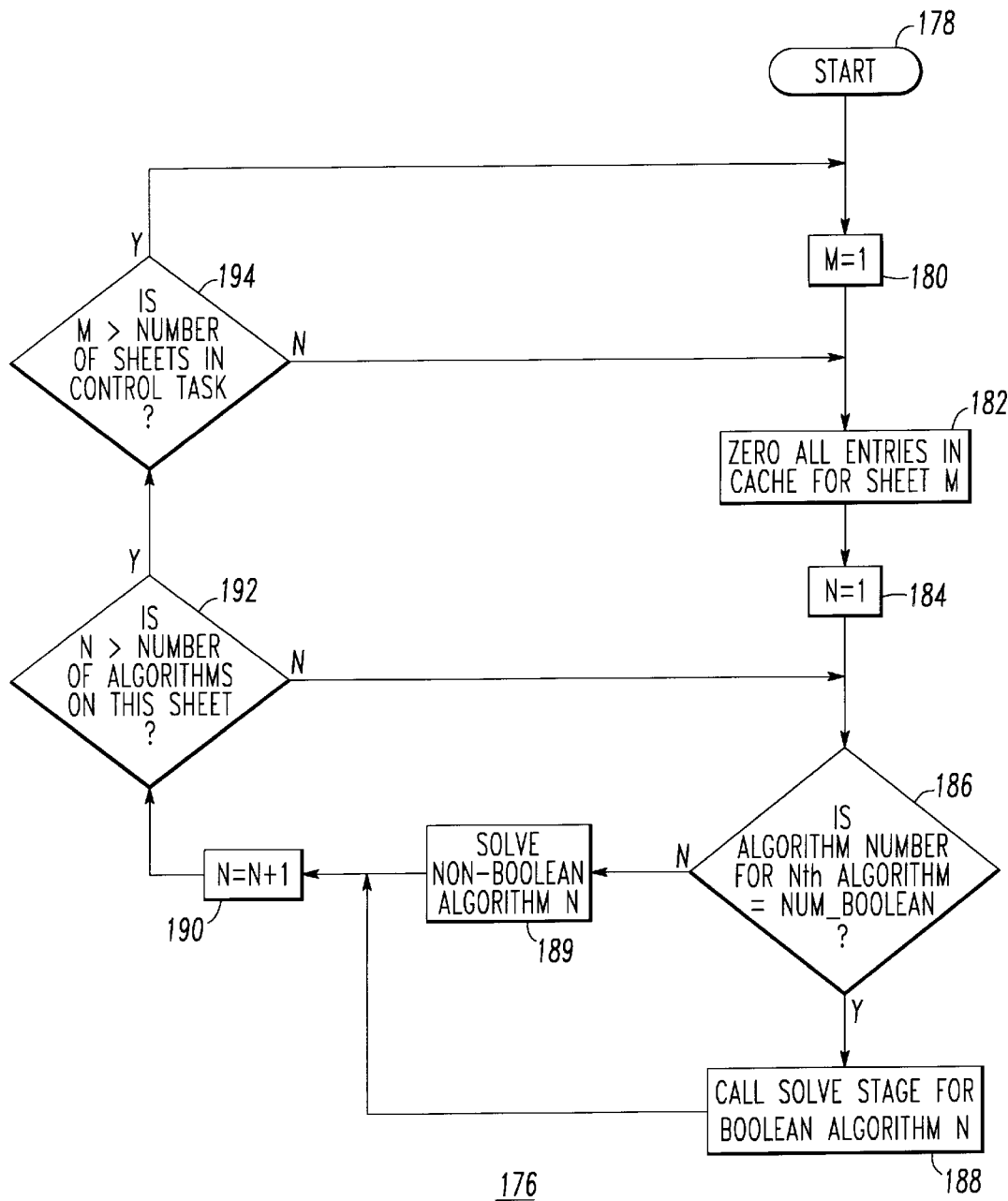
FIGS. 14–16 are flowcharts of software routines for execution by the processor of FIG. 5 to solve logic in accordance with the invention.
Figure 15:
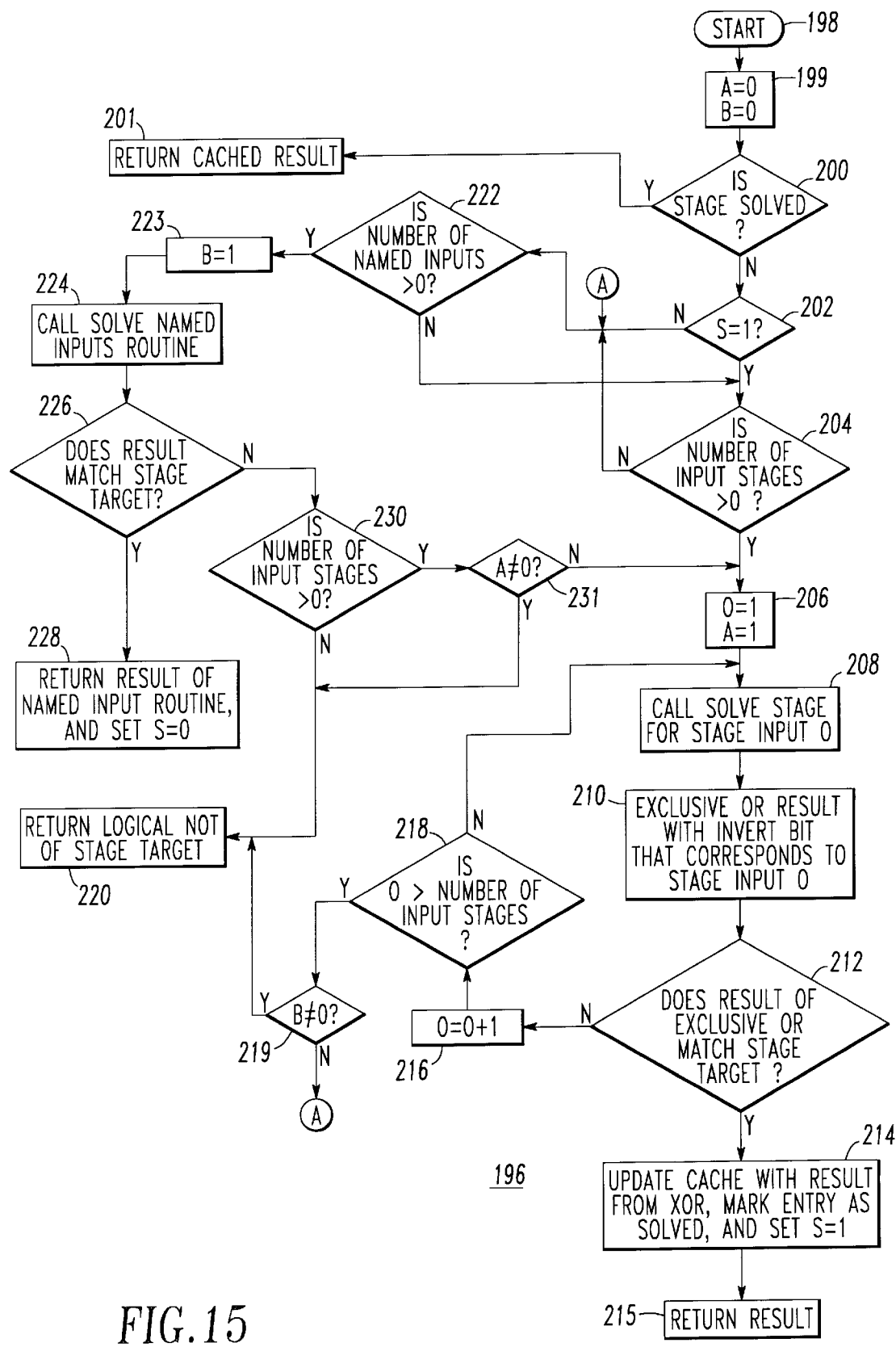

Referring to FIG. 14, the control task routine 176 of the processor 72 of FIG. 5 is illustrated. After starting at entry point 178, a drawing sheet counter M is initialized to one at 180. Then, at 182, the cache 45 of FIG. 2 containing each of the StageSolved fields 46 for drawing sheet M is zeroed to indicate that none of the stages of that sheet has been solved for the current execution cycle. At 184, an algorithm counter N is initialized to one. The algorithm counter N is employed as an index to an array of algorithms stored in the processor memory 76 of FIG. 5. For each of the algorithms in this array, an algorithm number is employed to identify the particular algorithm type (e.g., PID, TIMER, ONE-SHOT, boolean). At 186, if the algorithm number for algorithm N=NUM_boolean, then the present algorithm is a boolean algorithm (e.g., boolean combinatorial logic functions AND, OR). If so, the solve stage routine 196 of FIG. 15 is called at 188. In turn, the boolean value of the named output of the stage is stored in the memory (CM) 79 of the FDDI interface 78 of FIG. 5.

On the other hand, if the algorithm is not a boolean algorithm, then, at 189, a routine is called to solved the non-boolean algorithm. After either 188 or 189, the algorithm counter N is incremented at 190. Then, at 192, if the algorithm counter N is not greater than the count (stored in processor memory 76) of the algorithms on drawing sheet M, then step 186 is repeated. Otherwise, at 194, if the drawing sheet counter M is not greater than the count (stored in processor memory 76) of the drawing sheets for the control task, then step 182 is repeated. Otherwise, step 180 is repeated to provide the next execution cycle of the control task. It will be appreciated that the control task may preferably be executed at a periodic rate and/or may be integrated with other control tasks and/or the input/output scans of the processor 72.

Referring to FIG. 15, the solve stage routine 196 is illustrated. After being called at 198 by step 188 of the control task routine 176 of FIG. 14, at 199, boolean flags A and B are set to zero. Next, at 200, it is determined whether algorithm N (e.g., for this execution of routine 196, the stage at level zero and, thus, the output of algorithm N) has been solved for the present execution cycle of the control task routine 176 by examining the StageSolved field 46 of FIG. 2 for the present stage. If so, then, at 201, the cached result from the StageValue field 47 is returned. Otherwise, at 202, if a stage flag S is set, then the input stages to the present stage are evaluated starting at step 204. On the other hand, if the stage flag S is reset, then the named inputs are examined starting at step 222.

Figure 2:
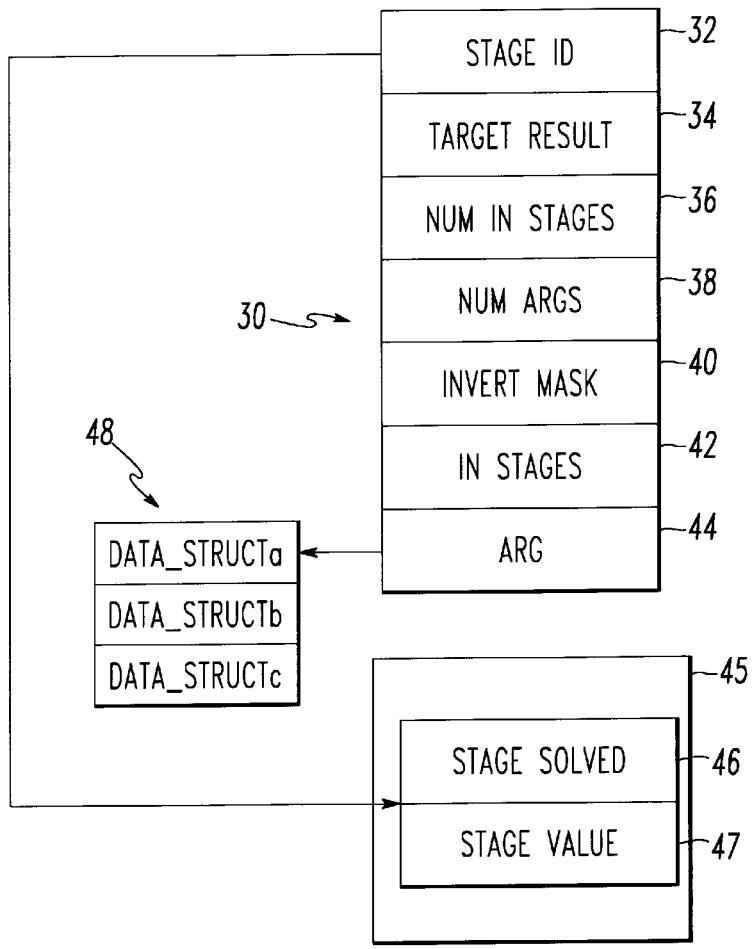
FIGS. 2 and 3 are data structures employed by the representations of FIG. 1.

At 204, if the numInStages field 36 of the stage data structure 30 of FIG. 2 for the present stage is greater than zero, then, at 206, an input stage counter O is set to one, and the flag A is set to one. At 208, the routine 196 is recursively called for each input stage (i.e., inStages (O)=Oth entry in the inStages array 42 of FIG. 2). In this manner, routine 196, through steps 208,210,212,216,218, recursively solves the output of at least some of the stages. Then, at 210, as discussed above in connection with FIG. 2, the Oth bit in the invertMask field 40 is employed to provide the corresponding invert bit (i.e., the Oth entry in the inStages array 42) for the result from step 208. In turn, this invert bit is logically XORed (not to be confused with the XOR circuit element of FIG. 13) with the result of step 208 to provide the selectively inverted stage input. At 212, if the result of step 210 is equal to the targetResult field 34 associated with the present stage, then, at 214, the StageValue field 47 is set to the result of step 210, the StageSolved field 46 is set to indicate that this stage is solved for the present execution cycle, and the stage flag S is set to indicate the preference, for the next execution cycle, that the stages be evaluated before the named inputs are examined. At 215, the result of step 210 is returned.

Otherwise, if the result of step 210 does not match the targetResult field, then, at 216, the input stage counter O is incremented. At 218, if the input stage counter O is not greater than the numInStages field 36 of the stage data structure 30 of FIG. 2, then step 208 is repeated for the O+1th entry in the inStages array 42. On the other hand, if the input stage counter O is greater than the numInStages field, then if the flag B is not zero at 219, then the logical NOT of the targetResult field is returned at 220. Otherwise, if flag B is zero at 219, then step 222 is executed.

Figure 16:
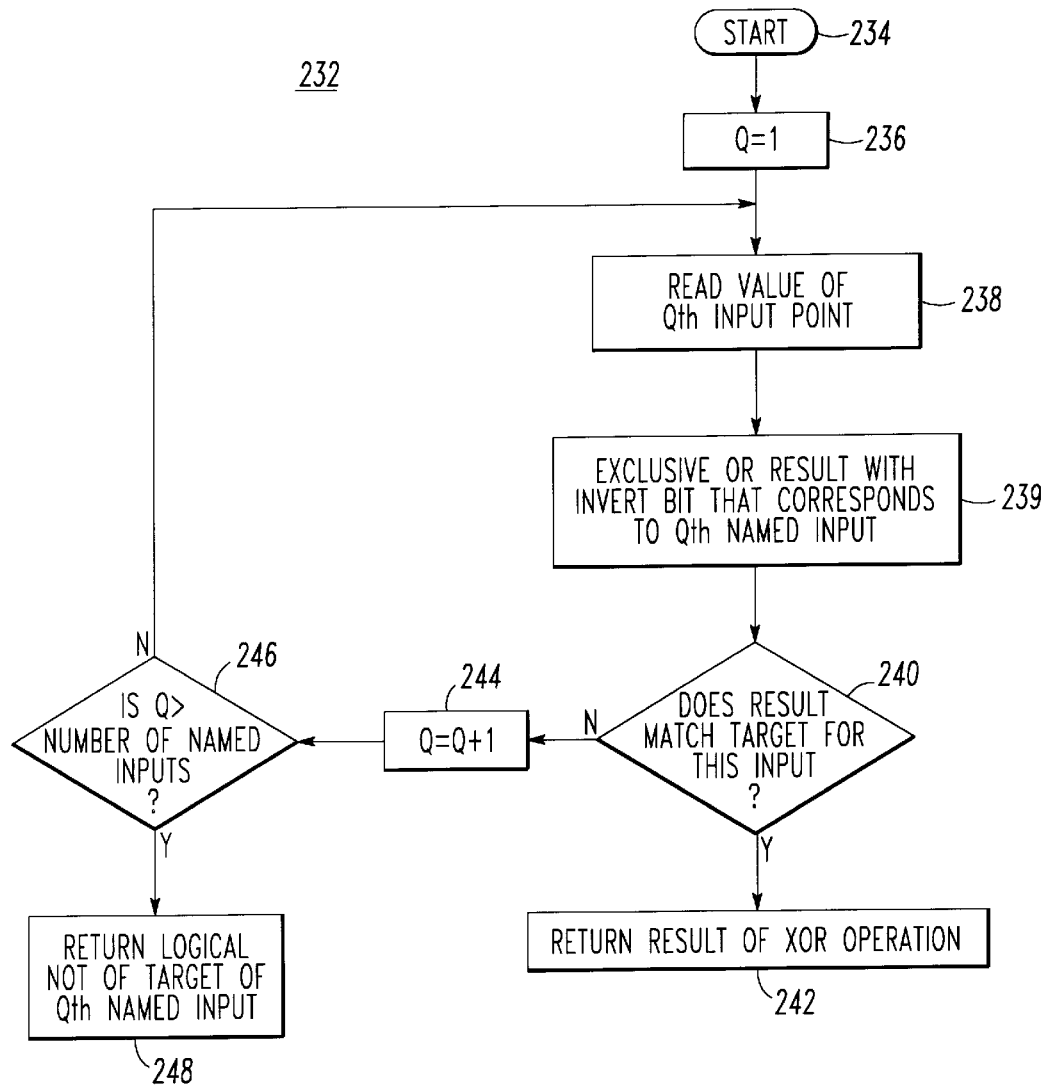

If the stage flag S is reset at 202, then the numArgs field 38 of the stage data structure 30 of FIG. 2 for the present stage is tested at 222. If the number of named inputs to the present stage is greater than zero, then the flag B is set to one at 223, and the solve named inputs routine 232 of FIG. 16 is called at 224. On the other hand, if the number of named inputs to this stage is zero, then step 204 is executed. It will be appreciated that the control builder preferably ensures that at least one of the numArgs field and the numInStages field is greater than zero.

At 226, if the result of step 224 is equal to the targetResult field 34 of FIG. 2 associated with the present stage, then, at 228, this result is returned and flag S is cleared. Otherwise, if the numInStages field 36 of the stage data structure 30 of FIG. 2 for the present stage is greater than zero at 230, and if the flag A is not zero at 231, then step 206 is executed. Otherwise, after either 230 or 231, since there are no further named inputs to this stage and since there are no input stages, then, at 220, the logical NOT of the targetResult field is returned. In this manner, step 214 or step 228 determines that the boolean result from the stages or the named inputs is equal to the targetResult field 34 of FIG. 2 or the Target field 102 of FIG. 3, respectively, and step 202, by examining the state of the flag S, selects whether the stages or the named inputs, respectively, are evaluated before the other for the next execution cycle.

It will be appreciated that the solve stage routine 196 employs a list of all of the stages or logic circuit elements, as defining by the inStages array 42, which may be employed for solving the output of the present stage or logic circuit element.

Referring to FIG. 16, the solve named inputs routine 232 is illustrated. After being called at 234 by step 224 of the solve stage routine 196 of FIG. 15, at 236, named input counter Q is set to one. Then, at 238, the counter Q is employed to index the array 48 of argument data structures of FIG. 2, obtain the SID for the named input, and, in turn, access the boolean value of the corresponding named input from the memory 79 of FIG. 5. At 239, this boolean value is logically XORed with the corresponding invertBit field 100 of FIG. 3. At 240, if the result of step 239 is equal to the Target field 102 of FIG. 3, then the result of step 239 is returned at 242. Otherwise, the named input counter Q is incremented at 244. Then, at 246, if counter Q is greater than the numArgs field 38 of FIG. 3, then the logical NOT of the present Target field 102 is returned at 248. On the other hand, if the counter Q is not greater than the present numArgs field 38, then step 238 is repeated.

The routines 176,196,232 form a boolean logic solving routine 250 which starts at the top-level stage (e.g., stage 104 of FIG. 6) and evaluates each stage until either the boolean value of a named input matches the Target field 102 of FIG. 3 or all of the input stages have been solved. Solving a stage consists of first reading one, some or all of the named inputs which are referenced by the argument structures. If any of the XORs of the boolean value of a named input and the invertBit field 100 of FIG. 3 matches the Target field of the same named input, then the stage is solved and the Target field is returned as the stage result.

Otherwise, if an examination of the named inputs does not produce a result which matches the targetResult, then one or more stages that are input by the present stage are solved recursively. Once the result of evaluating an input stage is known, that result is XORed with the bit of the invertMask field 40 which corresponds to that input stage. This XOR result is compared with the targetResult field 34 for the current stage. If there is a match, then the targetResult is returned as the stage result. Otherwise, the logical NOT of the targetResult is returned as the stage result.

Preferably, the boolean logic solving routine 250 maintains the cache 45 of FIG. 2 as a local data area in the processor memory 76 of FIG. 5 to store stage results on a per logic circuit drawing sheet basis. This local data area contains an entry for each stage and is indexed by the stageID field 32. Once a stage result is known, the corresponding entry in the local data area is updated with both the stage result in the StageValue field 47 and the boolean flag in the StageSolved field 46 which indicates that this particular stage is solved for the present execution cycle of the control task 176. When solving a stage, the boolean logic solving routine 250 first checks the local data area for the stage to determine if the stage has already been solved during the present execution cycle. If the stage has been solved, then the cached value for the stage is used. This provides additional optimization for stage results which are shared between several stages. At initialization, the local data area is initialized for each logic circuit drawing sheet to indicate that each stage has not being solved.

Additional optimization is applied at run-time of the boolean logic solving routine 250 by dynamically scheduling the order of evaluation of the named inputs and the stage inputs. If during an execution cycle, the targetResult for a stage is matched by evaluating a named input (i.e., flag S is reset by step 228), then during the next execution cycle the named inputs are evaluated first. This optimization is preferably employed when there is a high probability that named inputs (e.g., digital inputs, contact inputs, communication inputs) to the controllers 56,58,70 do not change state between execution cycles.

A similar idea applies to non-named inputs. In that case, if the stage's targetResult is matched by evaluating those inputs (i.e., flag S is set by step 214), then such inputs to the stage are evaluated first in the next execution cycle.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. In a plant process data acquisition and control system receiving plant process inputs and providing plant process outputs, including a logic controller apparatus for solving boolean logic comprising:

means for storing representations of logic, said logic including a logic function, wherein said logic function has a target value and a plurality of inputs corresponding to said plant process inputs, wherein each of the inputs of said logic function has a value, said logic further including a plurality of logic circuit elements, wherein each of said logic circuit elements includes at least one of an AND boolean circuit element and an OR boolean circuit element;

means for providing a plurality of digital logic signals;

means for solving said representations of said logic employing at least some of the digital logic signals; and means for solving said logic function when the value of at least one of the inputs of said logic function is equal to the target value and providing a corresponding plant process output;

wherein at least one input of said logic circuit elements is a plurality of inputs including at least one first input which is connected to an output of said logic circuit elements, and at least one second input which is interconnected with an output of said logic circuit elements by an inverter; and wherein said means for solving said logic function includes means employing a mask for selectively inverting at least one output of said logic circuit elements which is interconnected with the last said at least one second input.

2. The controller of claim 1 wherein each of said logic circuit elements has an output and at least one input; and wherein at least one of the at least one input of said logic circuit elements is connected to an output of one of said logic circuit elements.

3. The controller of claim 2 wherein said output of the last said logic circuit element is connected to a plurality of inputs of others of said logic circuit elements.

4. The controller of claim 3 wherein the output of each of said logic circuit elements has a boolean value; and wherein said means for solving said logic function has an execution cycle during which said logic function is solved, said means for solving said logic function further includes means for solving the boolean value of said one of said logic circuit elements and for solving the boolean value of said others of said logic circuit elements, with the boolean value of said one of said logic circuit elements being solved once during said execution cycle.

5. The controller of claim 2 wherein said means for storing representations of logic includes first memory means for storing first boolean values; wherein said means for providing a plurality of digital logic signals includes second memory means for storing second boolean values; wherein said at least one input of said logic circuit elements includes at least one first input which is connected to the output of one of said logic circuit elements, and at least one second input having one of the second boolean values; and wherein said means for solving said logic function includes output solving means for solving said output of the last said logic circuit element and storing the same as one of the first boolean values.

6. The controller of claim 5 wherein said means for solving said logic function further includes logic solving means for solving said logic when either: either the last said first boolean value or the last said second boolean value is equal to the target value, or all of said logic circuit elements have been solved.

7. The controller of claim 6 wherein said means for solving said logic function has an execution cycle during which said logic function is solved; and wherein said logic solving means includes means for determining that the last said first boolean value or the last said second boolean value is equal to the target value, and means for selecting whether the first inputs or the second inputs are evaluated before the other for a subsequent execution cycle.

8. The controller of claim 6 wherein said at least one first input includes a plurality of first inputs having some of the first boolean values and said at least one second input includes a plurality of second inputs having some of the second boolean values; and wherein said logic solving means includes means for determining that said some of the first boolean values of all of the first inputs and said some of the second boolean values of all of the second inputs are not equal to the target value, means for solving all of said logic circuit elements, and means for providing the complement of the target value for storage by said output solving means as one of the first boolean values.

9. The controller of claim 5 wherein said means for solving said representations includes means for inputting a first digital logic signal from said means for providing a plurality of digital logic signals as one of the second boolean values, and means for retrieving one of the first boolean values and outputting the same to said means for providing a plurality of digital logic signals as a second digital logic signal.

10. The controller of claim 9 wherein said first digital logic signal is selected from the group consisting of a communication input, a digital input, and a contact input; and wherein said second digital logic signal is selected from the group consisting of a communication output, a digital output, and a contact output.

11. The controller of claim 2 wherein said means for providing a plurality of digital logic signals includes memory means for storing boolean values; wherein said at least one input of said logic circuit elements is a plurality of first inputs each of which is interconnected with the output of one of said logic circuit elements, and a plurality of second inputs each of which has a target value and one of the boolean values stored by said memory means; and wherein said means for solving said logic function has an execution cycle during which said logic function is solved and includes means for determining in a current execution cycle whether the target value of one of said second inputs is equal to the last said boolean value stored by said memory means by evaluating one of the second inputs, and means for evaluating in a subsequent execution cycle the second inputs to determine whether the last said target value is equal to the last said boolean value before evaluating the first inputs.

12. The controller of claim 2 wherein said means for storing representations of logic includes memory means for storing boolean values; wherein said at least one input of said logic circuit elements is a plurality of first inputs each being interconnected with the output of one of said logic circuit elements and having one of a plurality of first boolean values, and a plurality of second inputs each of which has one of a plurality of second boolean values; and wherein said means for solving said logic function has an execution cycle during which said logic function is solved and includes means for determining in a current execution cycle whether the target value of one of said logic circuit elements is equal to the last said first boolean value by evaluating one of the first inputs, and means for evaluating in a following execution cycle the first inputs to determine whether the last said target value is equal to the last said first boolean value before evaluating the second inputs.

13. The controller of claim 2 wherein said at least one input of said logic circuit elements is a plurality of inputs, with each of at least some of the inputs of said logic circuit elements being interconnected with the output of one of said logic circuit elements; and wherein said means for solving said logic function includes means for recursively solving the output of at least some of said logic circuit elements.

14. The controller of claim 13 wherein the output of each of the logic circuit elements has a boolean value; wherein said means for storing representations of logic includes memory means for storing said boolean values; and wherein said means for solving said logic function has an execution cycle during which said logic function is solved and includes means for determining in a current execution cycle whether the output of one of said logic circuit elements has been solved, and means for alternatively: employing the boolean value of the last said output when the last said logic circuit element has been solved in said current execution cycle, or evaluating the boolean value of the last said output when the last said logic circuit element has not been solved in said current execution cycle.

15. The controller of claim 2 wherein said at least one input of said logic circuit elements is a plurality of inputs, with each of at least some of said inputs being connected to an output of said logic circuit elements.

16. The controller of claim 13 wherein said means for solving said logic function includes means employing a list of all of said logic circuit elements which may be employed for solving the output of another of said logic circuit elements.

17. The controller of claim 1 wherein said logic includes a boolean OR logic function; and wherein said target value is a logic one.

18. The controller of claim 1 wherein said logic includes a boolean AND logic function; and wherein said target value is a logic zero.

19. The controller of claim 1 wherein said logic is boolean logic.

20. The controller of claim 19 wherein said boolean logic includes boolean combinatorial logic functions.

21. The controller of claim 20 wherein said boolean combinatorial logic functions are selected from the group consisting of AND, OR, XOR, and NOT.

22. The controller of claim 1 wherein said logic includes sequential logic functions.

23. The controller of claim 22 wherein said sequential logic functions are selected from the group consisting of set-override FLIP-FLOP, and reset-override FLIP-FLOP.

24. The controller of claim 23 wherein said sequential logic functions are formed from boolean combinatorial logic functions.

* * * * *